(12) United States Patent
Yi et al.

(10) Patent No.: US 9,505,287 B2
(45) Date of Patent: Nov. 29, 2016

(54) ACTIVE DAMPING SYSTEM HAVING ELECTRICALLY CONTROLLED ACTUATOR

(71) Applicants: Kyoung Su Yi, Seoul (KR); Dong Hoon Shin, Seoul (KR)

(72) Inventors: Kyoung Su Yi, Seoul (KR); Dong Hoon Shin, Seoul (KR)

(73) Assignee: SEOUL NATIONAL UNIVERSITY R & DB FOUNDATION, Seoul (KR)

( * ) Notice: Subject to any disclaimer, the term of this patent is extended or adjusted under 35 U.S.C. 154(b) by 82 days.

(21) Appl. No.: 14/595,496

(22) Filed: Jan. 13, 2015

(65) Prior Publication Data

US 2016/0200160 A1 Jul. 14, 2016

(51) Int. Cl.
| | |
|---|---|
| *B60G 17/016* | (2006.01) |
| *B60G 17/06* | (2006.01) |
| *B60G 17/019* | (2006.01) |
| *B60G 13/14* | (2006.01) |
| *B60G 17/015* | (2006.01) |
| *B60G 17/018* | (2006.01) |

(52) U.S. Cl.
CPC .......... *B60G 17/0162* (2013.01); *B60G 13/14* (2013.01); *B60G 17/018* (2013.01); *B60G 17/019* (2013.01); *B60G 17/0157* (2013.01); *B60G 17/0164* (2013.01); *B60G 17/06* (2013.01); *B60G 2202/42* (2013.01); *B60G 2202/44* (2013.01); *B60G 2204/418* (2013.01); *B60G 2204/419* (2013.01); *B60G 2300/60* (2013.01); *B60G 2400/0511* (2013.01); *B60G 2400/0523* (2013.01); *B60G 2400/102* (2013.01); *B60G 2400/104* (2013.01); *B60G 2400/41* (2013.01); *B60G 2500/10* (2013.01)

(58) Field of Classification Search
None
See application file for complete search history.

(56) References Cited

U.S. PATENT DOCUMENTS 5,091,679 A * 2/1992 Murty ................ B60G 17/0157
180/165

* cited by examiner

*Primary Examiner* — Thomas Tarcza
*Assistant Examiner* — Garrett Evans
(74) *Attorney, Agent, or Firm* — John K. Park; Park Law Firm

(57) ABSTRACT

An active damping system has an electrically controlled actuator including: a steering wheel angle sensor; a yaw rate sensor; a lateral acceleration sensor; a vertical acceleration sensor; a roll angle sensor; a control mode determining unit configured to receive the signals detected by the sensors, thereby determining a control mode; a control signal generating unit configured to generate a control signal depending upon the control mode determined by the control mode determining unit; an electric motor which is operated according to the control signal of the control signal generating unit; and a ball screw which is rotated in cooperation with a rotation shaft of the electric motor at one side, and is meshed with an axle of the vehicle at the other side to vary a distance between the vehicle body and the axle according to the rotation of the electric motor.

6 Claims, 2 Drawing Sheets

ACTIVE DAMPING SYSTEM HAVING ELECTRICALLY CONTROLLED ACTUATOR

BACKGROUND OF THE INVENTION

Field of the Invention

The present invention relates to an active damping system having an electric motor for a vehicle, in which a damper is actuated in different ways depending upon traveling situations, thereby maintaining a stable contact between a road and wheels, and thus improving braking power, steering feel, and riding comfort.

Specifically, the present invention relates to an active damping system having an electrically controlled actuator that is differently controlled depending upon a traveling mode of a vehicle, and more particularly, to a technology of actuating a damper in a passive mode under a general traveling situation in which there are little changes in behavior of a vehicle body, while actuating the damper in an active mode in a case where a great change is shown in the behavior of the vehicle body, so that this provides a smooth and predictable ride quality, increasing safety and comfort.

Background of the Related Art

Suspension technology has developed rapidly since the beginning of 1900s. Earls S. MacPherson developed the MacPherson strut in 1950s, and Colin Chapman, who founded the sports car company Lotus Cars, developed an active damper in 1980s. His innovations gained popularity in Formula 1 because of reducing a handling defect caused by advancement in aerodynamic design.

A control system for the active damper is designed to maintain a contact force between the tire and the road, while minimizing the pitch and roll of the vehicle body in straight-line and cornering conditions. Also, the control system provides a damping function to minimize the effect of the impact of the tire against the road. This impact is produced by the pitch of the tire when it comes into contact with the recesses formed on the road, and has a jarring effect on occupants in the vehicle.

The conventional active damping system is designed to operate even while traveling on the generally straight road which causes little change in the behavior of the vehicle body. Although the passive damper can sufficiently maintain the stability of the vehicle body, the electrically controlled actuator is constantly being activated, which consumes the power and generates a lot of heat.

SUMMARY OF THE INVENTION

Therefore, the present invention has been made in view of the above problems, and an object of the present invention is to provide an active damping system capable of providing a driver with safety and comport even under any circumstances, and differently controlling a suspension depending upon a traveling mode of the vehicle to remarkably reduce the amount of power consumption which is a problem involved in the conventional suspension having an electrically controlled actuator.

Another object of the present invention is to provide an active damping system capable of preventing unnecessary heat from being generated to extend a lifespan of a product, and providing a driver and an occupant with the optimum ride quality and sense of stability.

According to an aspect of the present invention, there is provided an active damping system having an electrically controlled actuator comprising: a steering wheel angle sensor configured to detect an angle of a steering wheel of a vehicle; a yaw rate sensor configured to detect a yaw rate of a vehicle body; a lateral acceleration sensor configured to detect lateral acceleration of the vehicle body; a vertical acceleration sensor configured to detect vertical acceleration of the vehicle body; a roll angle sensor configured to detect a roll angle of the vehicle body; a control mode determining unit configured to receive the signals detected by the steering wheel angle sensor, the yaw rate sensor, the lateral acceleration sensor, and the vertical acceleration sensor, thereby determining a control mode; a control signal generating unit configured to generate a control signal depending upon the control mode determined by the control mode determining unit; an electric motor which is mounted on the vehicle body of the vehicle and operated according to the control signal of the control signal generating unit; and a ball screw which is rotated in cooperation with a rotation shaft of the electric motor at one side, and is meshed with an axle of the vehicle at the other side to vary a distance between the vehicle body and the axle according to the rotation of the electric motor.

The configuration of the present invention has the following technical advantages.

First, it is possible to differently control the active damping system depending upon the traveling mode of the vehicle, thereby providing the driver and the occupants with the optimum ride comfort and sense of stability.

The control mode determining unit receives the signals detected by the steering wheel angle sensor, the yaw rate sensor, the lateral acceleration sensor, and the vertical acceleration sensor to determine either a roll control mode, a vehicle body acceleration control mode, or a passive control mode.

Second, it is possible to minimize the power consumed by the operation of the active damper.

Specifically, if the control mode determining unit determines the passive control mode, the control signal generating unit generates the control signal to interrupt the power supplied to the electric motor, thereby stopping the operation (rotation) of the electric motor. In this instance, the damping force calculator, the motor torque converter, and the motor current controller provided in the control signal generating unit are not operated, and a reactive force of the stopped electric motor is used as a damping force, thereby minimizing unnecessary power consumption.

This benefits lead to minimization of the heat generated in the system, thereby improving the durability of the product.

In the case of the passive control mode, the reactive force of the stopped electric motor is used as the damping force, the unnecessary power consumption is minimized, and simultaneously the generation of the heat in the system is minimized, thereby improving the durability of the product.

DESCRIPTION OF SYMBOLS

Figure 1:
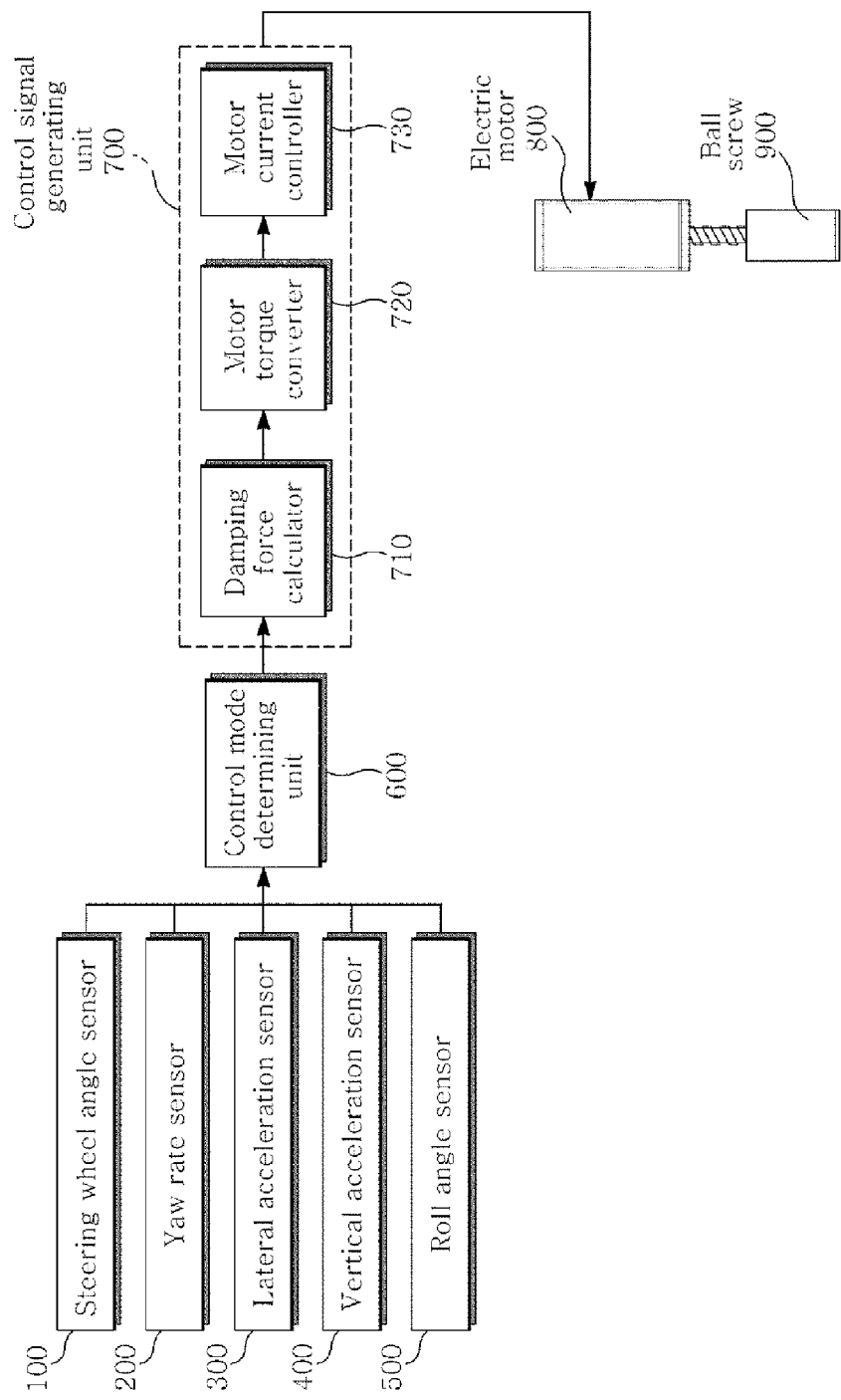
FIG. 1 is a block diagram illustrating the whole configuration of the present invention.

100: Steering wheel angle sensor
200: Yaw rate sensor
300: Lateral acceleration sensor
400: Vertical acceleration sensor
500: Roll angle sensor 600: Control mode determining unit
700: Control signal generating unit
710: Damping force calculator
720: Motor torque converter
730: Motor current controller
800: Electric motor
900: Ball screw

DETAILED DESCRIPTION OF THE PREFERRED EMBODIMENT

A preferred embodiment of the present invention will be hereafter described with reference to the accompanying drawings.

Figure 2:
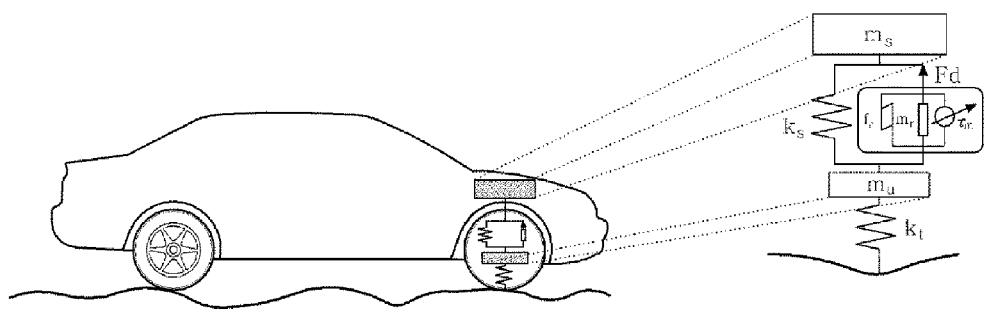
FIG. 2 is a view illustrating an active damping system equipped with an electrically controlled actuator according to the present invention.

FIG. 1 is a block diagram illustrating the whole configuration of the present invention. FIG. 2 is a view illustrating an active damping system equipped with an electrically controlled actuator (electric motor and ball screw) according to the present invention.

In FIG. 2, $F_d$ means a damping force, $\tau_m$ means motor torque, $m_r$ means mass of a damper driven by an electric motor 800, $f_r$ means a frictional force of the damper generated when the electric motor 800 operates, $k_s$ means spring stiffness, $k_t$ means tire stiffness, $m_s$ means mass of a vehicle body (sprung mass), and $m_u$ means mass of a vehicle axle (unsprung mass).

A steering wheel angle sensor 100 is mounted on a steering wheel of a vehicle to detect a steering wheel angle.

A yaw rate sensor 200 is mounted on the vehicle body of the vehicle to detect a yaw rate (rad/sec) of the vehicle body.

A lateral acceleration sensor 300 is mounted on the vehicle body of the vehicle to detect lateral acceleration of the vehicle body.

A vertical acceleration sensor 400 is mounted on the vehicle body to detect vertical acceleration of the vehicle body.

A roll angle sensor 500 is mounted on the vehicle body to detect a roll angle of the vehicle body.

A control mode determining unit 600 receives the signals detected by the steering wheel angle sensor 100, the yaw rate sensor 200, the lateral acceleration sensor 300, and the vertical acceleration sensor 400 to determine a control mode, and is not limited to a mounting position.

A control signal generating unit 700 generates a different control signal depending upon the control mode determined by the control mode determining unit 600.

An electric motor 800 is mounted on the vehicle body, and constitutes a body of an active damping system having an electrically controlled actuator, together with a ball screw 900, and is operated (rotated) according to the control signal of the control signal generating unit 700.

The ball screw 900 is rotated in cooperation with a rotation shaft of the electric motor 800 at one side, and is meshed with the axle of the vehicle at the other side. The ball screw 900 constitutes the body of the active damping system having the electrically controlled actuator, together with the ball screw 900, to vary the distance between the vehicle body and the axle by extending or shortening the whole length the active damper of the electrically controlled actuator damper type according to the rotation of the electric motor 800.

The detailed function of the control mode determining unit 600 is as follows.

The control mode determining unit 600 receives the signals detected by the steering wheel angle sensor 100, the yaw rate sensor 200, the lateral acceleration sensor 300, and the vertical acceleration sensor 400 to determine any one of a roll control mode, a vehicle body acceleration control mode, and a passive control mode.

The vehicle body acceleration control mode is determined if vertical acceleration (z″) detected by the vertical acceleration sensor 400 is higher than a predetermined reference value.

The roll control mode is determined if a steering wheel angle (δ) detected by the steering wheel angle sensor 100 is higher than a predetermined reference value, lateral acceleration (ay) detected by the lateral acceleration sensor 300 is higher than a predetermined reference value, and a yaw rate (γ) detected by the yaw rate sensor 200 is higher than a predetermined reference value.

The passive control mode is determined in a case where it does not belong in the roll control mode and the vehicle body acceleration control mode.

The control signal generating unit 700 includes a damping force calculator 710, a motor torque converter 720, and a motor current controller 730, and generates a different control signal depending upon the control mode determined by the control mode determining unit 600, as follows.

If the control mode determining unit 600 determines the passive control mode, the control signal generating unit 700 generates the control signal to interrupt the power supplied to the electric motor 800, thereby stopping the operation (rotation) of the electric motor 800. In this instance, the damping force calculator 710, the motor torque converter 720, and the motor current controller 730 provided in the control signal generating unit 700 are not operated, and a reactive force of the stopped electric motor 800 is used as a damping force.

If the control mode determining unit 600 determines the vehicle body acceleration control mode or the roll control mode, the damping force calculator 710 calculates the damping force corresponding to each control mode.

That is, in case of the vehicle body acceleration control mode or the roll control mode, $$J = \lim_{T \to \infty} \frac{1}{T} E\left[\int_0^T (z_{sL}^2 + z_{sR}^2 + x^T \cdot Q \cdot x + F_d^T \cdot R \cdot F_d) dt\right]$$

In the above equation, J means a performance index, $Z_s$ means a vertical deflection of the sprung mass, in which suffixes L and R mean a left side and a right side, respectively, x means a state variable, and $F_d$ means a damping force.

$$Q = \text{diag}[\rho_1 \; \rho_2 \; \rho_3 \; \rho_4 \; \rho_5 \; \rho_6 \; \rho_7 \; \rho_8 \; \rho_9 \; \rho_{10}]$$

$$R = \begin{bmatrix} \rho_{11} & 0 \\ 0 & \rho_{12} \end{bmatrix}$$

In the above equation, $\rho_1, \ldots, \rho_2$ mean weight factors.

In the above equations, the damping force ($F_d$) is determined in a way of minimizing the performance index (J). Different weight values should be applied in cases of the vehicle body acceleration control mode and the roll control mode.

For example, in the case of the vehicle body acceleration control mode, $\rho_1=e^3$, $\rho_2=e^3$, $\rho_3=e$, $\rho_4=e^3$, $\rho_5=e^3$, $\rho_6=e^3$, $\rho_7=e$, $\rho_8=e$, $\rho_9=e^2$, $\rho_{10}=e$, $\rho_{11}=0.1$, and $\rho_{12}=0.1$.

In the case of the roll control mode, $\rho_1=e^2$, $\rho_2=e^2$, $\rho_3=e$, $\rho_4=e$, $\rho_5=e^2$, $\rho_6=e^2$, $\rho_7=e$, $\rho_8=e$, $\rho_9=e^4$, $\rho_{10}=e^2$, $\rho_{11}=0.1$, and $\rho_{12}=0.1$, herein e means a natural logarithm.

In addition, the state variables x are as follows.

$x_1 = x_{sL} - z_{uL}$ $x_2 = z_{sR} - z_{uR}$ $x_3 = \dot{z}_{sL}$ $x_4 = z_{uL} - z_{rL}$ $x_5 = z_{uL} - z_{rL}$ $x_6 = z_{uR} - z_{rR}$ $x_7 = \dot{z}_{uL}$ $x_8 = \dot{z}_{uR}$ $x_9 = \phi$ $x_{10} = \dot{\phi}$ Herein, $Z_s$ means a vertical deflection of the sprung mass, in which suffixes L and R mean a left side and a right side, respectively, $Z_u$ means a vertical deflection of the unsprung mass, in which suffixes L and R mean a left side and a right side, respectively, and $\phi$ means a roll angle of the vehicle body.

The damping force calculated by the damping force calculator 710 is converted into motor torque of the electric motor 800 by the motor torque converter 720.

That is, the motor torque converter 720 converts the damping force into the motor torque, as follows:

$$F_d = \frac{2\pi}{l} \cdot \tau_m - m_r \cdot (\ddot{z}_s - \ddot{z}_u) - f_r \mathrm{sgn}(\dot{z}_s - \dot{z}_u)$$

In the above equation, $F_d$ means the damping force, $\tau_m$ means the motor torque, l means a lead length of the ball screw 900, $m_r$ means mass of the damper driven by the electric motor 800, $Z_s$ means a vertical deflection of the sprung mass, in which a single dot over a symbol indicates a speed value, and double dots indicate an acceleration value, $Z_u$ means a vertical deflection of the unsprung mass, in which a single dot over a symbol indicates a speed value, and double dots indicate an acceleration value, and $f_r$ means a frictional force of the damper generated when the electric motor 800 operates.

The motor torque ($\tau_m$) is calculated from the damping force ($F_d$) through the relation function.

The motor current controller 730 calculates the current to generate the motor torque converted by the motor torque converter 720, and controls the current supplied to the electric motor 800. If the value of the motor torque is high, a high current is supplied to the electric motor 800, while if the value of the motor torque is low, a relatively low current is supplied to the electric motor 800.

While the present invention has been described with reference to the particular illustrative embodiment, it is not to be restricted by the embodiments but only by the appended claims. It is to be appreciated that those skilled in the art can change or modify the embodiments without departing from the scope and spirit of the present invention.

What is claimed is:

1. An active damping system having an electrically controlled actuator comprising:
   a steering wheel angle sensor (100) configured to detect an angle of a steering wheel of a vehicle;
   a yaw rate sensor (200) configured to detect a yaw rate of a vehicle body;
   a lateral acceleration sensor (300) configured to detect lateral acceleration of the vehicle body;
   a vertical acceleration sensor (400) configured to detect vertical acceleration of the vehicle body;
   a roll angle sensor (500) configured to detect a roll angle of the vehicle body;
   a control mode determining unit (600) configured to receive the signals detected by the steering wheel angle sensor (100), the yaw rate sensor (200), the lateral acceleration sensor (300), and the vertical acceleration sensor (400), thereby determining a control mode;
   a control signal generating unit (700) configured to generate a control signal depending upon the control mode determined by the control mode determining unit (600);
   an electric motor (800) which is mounted on the vehicle body of the vehicle and operated according to the control signal of the control signal generating unit (700); and
   a ball screw (900) which is rotated in cooperation with a rotation shaft of the electric motor at one side, and is meshed with an axle of the vehicle at the other side to vary a distance between the vehicle body and the axle according to rotation of the electric motor (800),
   wherein the control mode determining unit (600) determine any one of a roll control mode, a vehicle body acceleration control mode, and a passive control mode,
   in which the vehicle body acceleration control mode is determined if the vertical acceleration (z") detected by the vertical acceleration sensor 400 is higher than a predetermined reference value,
   the roll control mode is determined if the steering wheel angle ($\delta$) detected by the steering wheel angle sensor (100) is higher than a predetermined reference value, the lateral acceleration (ay) detected by the lateral acceleration sensor (300) is higher than a predetermined reference value, and the yaw rate ($\gamma$) detected by the yaw rate sensor (200) is higher than a predetermined reference value, and
   the passive control mode is determined in a case where it does not belong in the roll control mode and the vehicle body acceleration control mode.

2. The active damping system according to claim 1, wherein if the control mode determining unit (600) determines the passive control mode, the control signal generating unit (700) interrupts the power supplied to the electric motor (800), and uses a reactive force of the electric motor as a damping force.

3. The active damping system according to claim 1, wherein the control signal generating unit (700) includes, if the control mode determining unit (600) determines the vehicle body acceleration control mode or the roll control mode, a damping force calculator (710) for calculating the damping force corresponding to each control mode; a motor torque converter (720) for converting the damping force calculated by the damping force calculator (710) into motor torque of the electric motor (800); and a motor current controller (730) for calculating a current to generate the motor torque converted by the motor torque converter (720), and supplying the current to the electric motor (800).

4. The active damping system according to claim 3, wherein in the case of the vehicle body acceleration control mode or the roll control mode, the damping force calculator (710) determines the damping force ($F_d$) in a way of minimizing the performance index (J), based on Equations below:

$$J = \lim_{T \to \infty} \frac{1}{T} E\left[\int_0^T (\ddot{z}_{sL}^2 + \ddot{z}_{sR}^2 + x^T \cdot Q \cdot x + F_d^T \cdot R \cdot F_d) dt\right]$$

herein, J means a performance index, $Z_s$ means a vertical deflection of the sprung mass, in which suffixes L and R mean a left side and a right side, respectively, x means a state variable, and $F_d$ means a damping force, and $$Q = \text{diag}[\rho_1 \ \rho_2 \ \rho_3 \ \rho_4 \ \rho_5 \ \rho_6 \ \rho_7 \ \rho_8 \ \rho_9 \ \rho_{10}]$$

$$R = \begin{bmatrix} \rho_{11} & 0 \\ 0 & \rho_{12} \end{bmatrix}$$

herein, $\rho_1, \rho_2, \rho_3, \rho_4, \rho_5, \rho_6, \rho_7, \rho_8, \rho_9, \rho_{10}, \rho_{11}, \rho_{12}$ mean weight factors.

5. The active damping system according to claim 4, wherein state variables x are as follows $$x_1 = z_{sL} - z_{uL}$$

$$x_2 = z_{sR} - z_{uR}$$

$$x_3 = \dot{z}_{sL}$$

$$x_4 = z_{uL} - z_{rL}$$

$$x_5 = z_{uL} - z_{rL}$$

$$x_6 = z_{uR} - z_{rR}$$

$$x_7 = \dot{z}_{uL}$$

$$x_8 = \dot{z}_{uR}$$

$$x_9 = \phi$$

$$x_{10} = \dot{\phi}$$

herein, $Z_s$ means a vertical deflection of the sprung mass, in which suffixes L and R mean a left side and a right side, respectively, $Z_u$ means a vertical deflection of the unsprung mass, in which suffixes L and R mean a left side and a right side, respectively, and $\phi$ means a roll angle of the vehicle body.

6. The active damping system according to claim 5, wherein the motor torque converter (720) calculates the motor torque ($\tau_m$) from the damping force ($F_d$), based on Equation below:

$$F_d = \frac{2\pi}{l} \cdot \tau_m - m_r \cdot (\ddot{z}_s - \ddot{z}_u) - f_r \text{sgn}(\dot{z}_s - \dot{z}_u)$$

herein, $F_d$ means the damping force, $\tau_m$ means the motor torque, l means a lead length of the ball screw (900), $m_r$ means mass of the damper driven by the electric motor (800), $Z_s$ means a vertical deflection of the sprung mass, in which a single dot over a symbol indicates a speed value, and double dots indicate an acceleration value, $Z_u$ means a vertical deflection of the unsprung mass, in which a single dot over a symbol indicates a speed value, and double dots indicate an acceleration value, and $f_r$ means a frictional force of the damper generated when the electric motor (800) operates.

* * * * *